United States Patent
Wei

(10) Patent No.: US 10,124,289 B2
(45) Date of Patent: Nov. 13, 2018

(54) DESULFURIZATION AND DENITRATION AGENT

(71) Applicant: Yongfeng Boyuan Industry Co. Ltd., Jiangxi Province, Ji'an, Jiangxi (CN)

(72) Inventor: Xionghui Wei, Beijing (CN)

(73) Assignee: YONGFENG BOYUAN INDUSTRY CO. LTD., JIANGXI PROVINCE, Ji'an, Jiangxi (CN)

( * ) Notice: Subject to any disclaimer, the term of this patent is extended or adjusted under 35 U.S.C. 154(b) by 0 days.

(21) Appl. No.: 15/555,810

(22) PCT Filed: Mar. 9, 2016

(86) PCT No.: PCT/CN2016/075922
§ 371 (c)(1),
(2) Date: Sep. 5, 2017

(87) PCT Pub. No.: WO2016/150302
PCT Pub. Date: Sep. 29, 2016

(65) Prior Publication Data
US 2018/0043302 A1   Feb. 15, 2018

(30) Foreign Application Priority Data

Mar. 20, 2015   (CN) .......................... 2015 1 0124669

(51) Int. Cl.
*C08G 63/12*   (2006.01)
*B01D 53/50*   (2006.01)
(Continued)

(52) U.S. Cl.
CPC ............. *B01D 53/60* (2013.01); *B01D 53/50* (2013.01); *B01D 53/507* (2013.01); *B01D 53/56* (2013.01);
(Continued)

(58) Field of Classification Search
CPC ...... B01D 53/60; B01D 53/507; B01D 53/56; B01D 53/78; B01D 2252/2023;
(Continued)

(56) References Cited

U.S. PATENT DOCUMENTS

| 3,649,190 A | 3/1972 | Deschamps et al. |
| 4,324,734 A * | 4/1982 | Rehm .................... C08G 63/87 516/187 |

(Continued)

FOREIGN PATENT DOCUMENTS

| CN | 1768902 A | 5/2006 |
| CN | 101352645 A | 1/2009 |

(Continued)

OTHER PUBLICATIONS

European Patent Office, Extended European Search Report, dated Apr. 20, 2018.

*Primary Examiner* — Timothy C Vanoy
(74) *Attorney, Agent, or Firm* — Novick, Kim & Lee, PLLC; Allen Xue

(57) ABSTRACT

A desulfurization and denitration agent which is a mixture of polyalcohol and/or polyglycol substances, polycarboxylic acid substances and alkaline substances heated to above 90° C. and yielding, after condensation and/or polymerization, macromolecular or high-polymer ethers and/or esters for use in removing sulfur dioxides and/or nitrogen oxides from gases.

13 Claims, 1 Drawing Sheet

(51) Int. Cl.
  *B01D 53/56* (2006.01)
  *B01D 53/60* (2006.01)
  *B01D 53/78* (2006.01)
(52) U.S. Cl.
  CPC ............ *B01D 53/78* (2013.01); *C08G 63/12* (2013.01); *B01D 2252/2025* (2013.01); *B01D 2252/2026* (2013.01); *B01D 2252/2028* (2013.01); *Y02A 50/2344* (2018.01); *Y02A 50/2349* (2018.01)
(58) Field of Classification Search
  CPC ...... B01D 2252/2025; B01D 2257/302; B01D 2257/402; B01D 2257/404; B01D 2258/0283; C08G 63/12; C08G 63/668; C08G 63/685
  See application file for complete search history.

(56) References Cited

U.S. PATENT DOCUMENTS 5,179,191 A * 1/1993 Jung .................... C08G 63/685
                                                              525/420
7,148,293 B2 * 12/2006 Stumbe ................ C08G 63/668
                                                              525/437

FOREIGN PATENT DOCUMENTS

| | | | |
|---|---|---|---|
| CN | 101874968 A | 11/2010 | |
| CN | 102847418 A | 1/2013 | |
| CN | 103432878 A | 12/2013 | |
| CN | 103495340 A | 1/2014 | |
| CN | 104437059 A | 3/2015 | |
| EP | 2812373 A1 * | 12/2014 | ............. C08G 63/12 |
| EP | 3153224 A1 | 4/2017 | |
| FR | 1530766 A * | 6/1968 | ......... C08G 59/4292 |
| JP | 2002193788 A | 7/2002 | |
| JP | 5991822 B2 * | 9/2016 | ............. C08G 63/12 |
| NL | 6904552 A | 10/1969 | |
| WO | 2013018884 A1 | 2/2013 | |
| WO | 2015/055104 A1 | 4/2015 | |

* cited by examiner

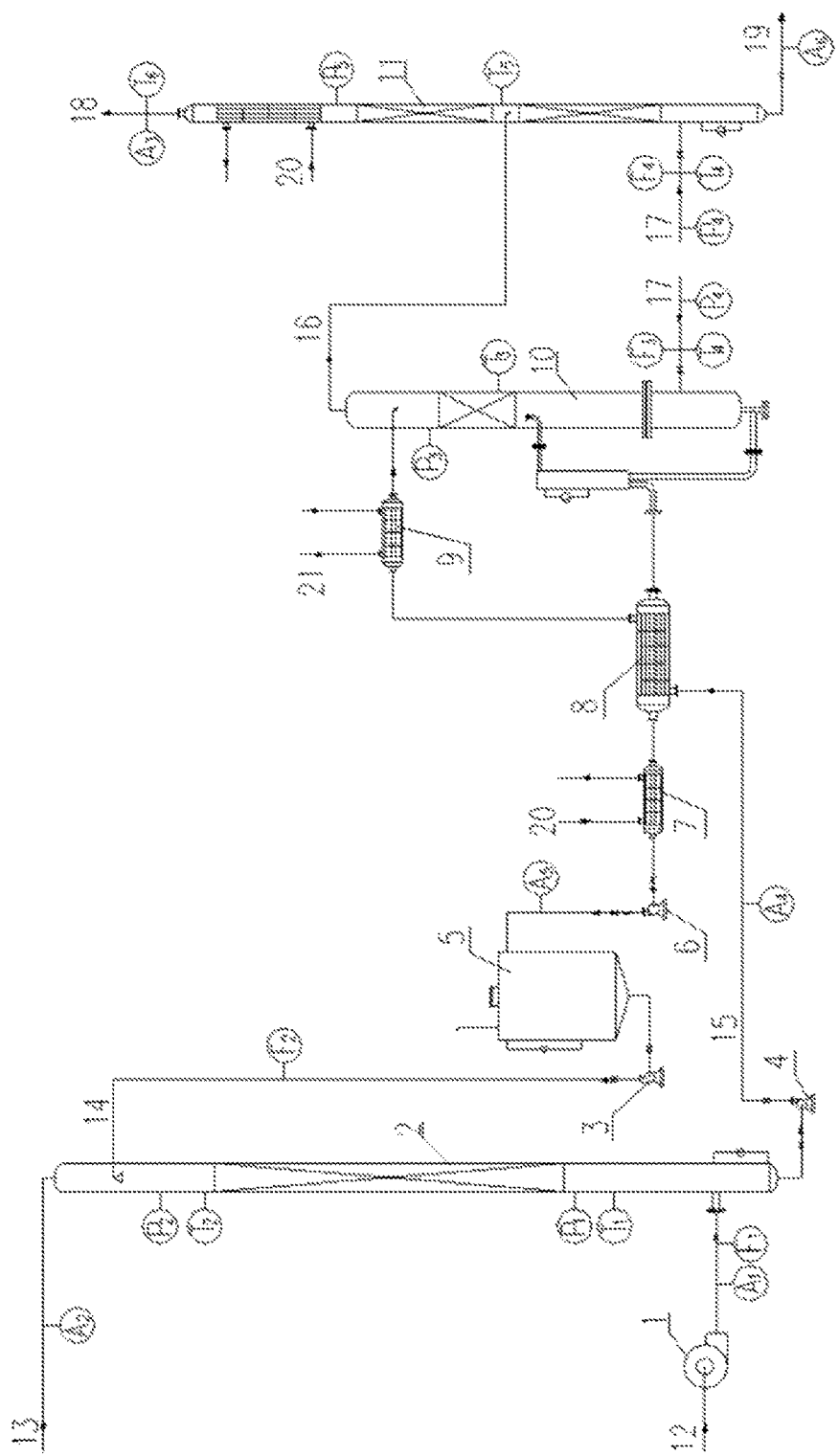

DESULFURIZATION AND DENITRATION AGENT

TECHNICAL FIELD

The present invention relates to the industrial field of gas desulfurization and/or denitration, and specifically to a desulfurization-denitration agent for desulfurization and/or denitration of flue gases or various combustion tail (waste) gases.

BACKGROUND ART

Fossil fuel combustion produces a large quantity of flue gases which is discharged into atmosphere, wherein besides sulfur dioxide, sulfur trioxide, hydrogen chloride, hydrogen fluoride, nitrogen oxides and a small quantity of harmful organic substances, a large quantity of dusts is contained. There are tiny hydrophilic and non-hydrophilic particles (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, phosphate particles and the like) in these dusts. These particles are discharged together with the flue gases into atmosphere. At the same time, sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomena of haze and atmospheric photochemical reactions, and causing serious environmental pollution. Therefore, research on flue gas desulfurization and denitration is quite urgent and also challenging.

At present, desulfurization process and denitration process of flue gases are independent of each other. Typically, denitration is followed by desulfurization.

For the existing desulfurization process, there are mainly desulfurization process of hearth calcium-spraying combustion method as well as dry desulfurization process and wet desulfurization process for flue gases, industrial raw material gases and other waste gases containing sulfur, and so on.

In the dry desulfurization process, a flue gas passes through a dry desulfurizer before being vented, and is vented after being desulfurized. The dry desulfurizer is filled with a solid particulate dry desulfurization agent, which is usually iron oxide, zinc oxide, manganese oxide, cobalt oxide, chromium oxide, molybdenum oxide, and the like. Such dry desulfurization agent absorbs the sulfur dioxide in the flue gas and then generates corresponding sulfite. When such oxide loses its ability to absorb sulfur dioxide, it has to be replaced with a new dry desulfurization agent. The consumption of dry desulfurization agent is extremely large, and it is expensive, while a large quantity of waste residues is produced at the same time, which need to be piled up and landfilled, resulting in the phenomena of serious pollution transfer and secondary pollution.

The desulfurization agents used in the wet desulfurization process are mainly calcium carbonate, magnesium carbonate, calcium oxide, magnesium oxide, ammonia, sodium (or potassium) sulfite, organic acid-organic acid salt buffer solution, and the like.

In the desulfurization process thereof, calcium carbonate, magnesium carbonate, calcium oxide, magnesium oxide, and the like are ground into fine powders with a mesh number greater than 325 mesh, and then formulated into a slurry containing 10%-15% calcium carbonate powder. In an absorption tower, the slurry contacts with the flue gas, and sulfur dioxide in the gas reacts with calcium carbonate or magnesium carbonate or calcium oxide or magnesium oxide in the slurry to produce calcium sulfite or magnesium sulfite.

In the air forced oxidation layer of the desulfurization tower, the calcium sulfite slurry is oxidized to calcium sulfate, thus the calcium sulfite slurry is converted to a calcium sulfate slurry. The calcium sulfate slurry flows out of the absorption tower and enters into a separator to separate calcium sulfate from the slurry. Water separated out is returned for recycle use to prepare calcium carbonate slurry. Calcium sulfate separated out is either landfilled as a waste residue or is used for roadbed repairing, or it can be purified and used for making plasterboards. However, this process generates a lot of solids of calcium sulfate, which also contain solid wastes such as some calcium sulfite, unreacted calcium carbonate, and the like. With large limestone consumption, huge devices of crushing and milling, and high power consumption, the investment is great. Moreover, solid precipitates, which tend to clog the devices, are produced during the absorption process. Sewage discharge is large, and secondary pollution is serious.

As for the magnesium sulfite slurry, it is subjected to precipitation and enters into a separator to separate magnesium sulfite from the slurry. Water separated out is returned for recycle use to prepare magnesium oxide slurry. Magnesium sulfite separated out is calcined at a temperature above 1235K to produce magnesium oxide and gaseous sulfur dioxide. Magnesium oxide produced is used repeatedly, and sulfur dioxide can be recycled. However, the magnesium sulfite solids produced in the process tend to clog the pipelines and devices, and also, magnesium sulfite does not decompose until it is calcined at a temperature above 1235K, thus energy consumption is high, investment is large, and secondary pollution is serious.

Meanwhile, tiny hydrophilic and non-hydrophilic particles (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, phosphate particles and the like) contained in the slurry of calcium carbonate, magnesium carbonate, calcium oxide, magnesium oxide, and the like are carried out by the flue gas, and discharged into atmosphere, while sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomena of haze and atmospheric photochemical reactions, and causing serious environmental pollution.

In ammonia desulfurization process, ammonia is used as the desulfurization agent, and an aqueous ammonia of a certain concentration is used as an absorbent to absorb the sulfur dioxide in the flue gas, ammonium bisulfite is generated from the reaction, and is converted to ammonium bisulfate by forced oxidation. Ammonium bisulfate is finally basified to ammonium sulfate by ammonia, and ammonium sulfate is separated as a fertilizer by-product. However, ammonia has high toxicity, very strong volatility and low boiling point, thus the phenomenon of ammonia entrained in the flue gas is serious, resulting in heavy loss of ammonia and secondary atmospheric pollution caused by ammonia. At the same time, the consumption of ammonia is very large, and ammonia is converted to low-valued ammonium sulfate, thus the cost of desulfurization is high, and crystallization is likely to occur, clogging devices and pipelines. Moreover, ammonia is highly corrosive, thus the device corrosion is serious, and ammonia production process is a process of high energy consumption and high pollution, excessive consumption of ammonia is actually a process of indirectly worsening environmental pollution and increasing energy consumption, therefore the use of ammonia should be minimized.

In seawater desulfurization process, a large quantity of salts of calcium, magnesium, aluminum, sodium, potassium and other ions contained in the seawater, especially carbonates, is used as desulfurization agents, and these desulfurization agents react with sulfur dioxide to produce sulfite. Seawater with absorbed sulfur dioxide is subjected to sun exposure and oxidation, wherein the sulfite is oxidized to sulfate, and then discharged directly into the sea. This technology and process can only be applied at seaside, because the seawater consumption is particularly large. As a large quantity of sulfates is discharged into the sea, seawater environment is more or less damaged.

In sodium (or potassium) sulfite process, sodium (or potassium) sulfite is used as the desulfurization agent, and in an absorption tower, its aqueous solution contacts with the flue gas. Sulfur dioxide in the gas reacts with sodium (or potassium) sulfite in the solution to produce sodium (or potassium) bisulfite, thus the sodium (or potassium) sulfite solution is converted to a sodium (or potassium) bisulfite solution. The sodium (or potassium) bisulfite solution is regenerated by heating, and the sodium (or potassium) bisulfite solution is converted to aqueous solution of sodium (or potassium) sulfite, and sulfur dioxide is released at the same time. The aqueous solution of sodium (or potassium) sulfite is recycled for use, and sulfur dioxide gas can be recovered as a by-product. The process is better in terms of conception, however, practical tests show that the regeneration rate by heating of sodium (or potassium) bisulfite solution is very low, only a very small part of sodium (or potassium) bisulfite can be converted to sodium (or potassium) sulfite, most of sodium (or potassium) bisulfite cannot be decomposed, and steam consumption is large. Therefore, industrialization of the process has always been unachievable.

Wellman-Lord desulfurization process is actually an improved sodium sulfite circulation process, but with a multi-effect evaporation procedure added thereto, for the evaporation of desulfurization solution to crystallize sodium sulfite. There are large-scale application examples of this process in the United States, Germany, France and Japan, but its steam consumption is large, and energy consumption is high.

In the organic acid-organic acid salt buffer solution desulfurization process, a buffer solution comprised of organic acid and organic acid salt is used as a desulfurization solution, and in an absorption tower, it contacts with the flue gas, and sulfur dioxide in the gas reacts with the organic acid salt in the solution to produce bisulfite and organic acid. The solution is regenerated by heating, the sulfite in the solution is converted to organic acid salt, and the solution is still converted to the organic acid-organic acid salt buffer solution for repeated use. At the same time, sulfur dioxide is released, and the sulfur dioxide gas can be recovered as a by-product. The process is better in terms of conception, however, practical tests show that the regeneration rate of sulfite in the organic acid-organic acid salt buffer solution is very low during steam heating, only a very small part of sulfite can be converted to organic acid salt, most parts of sulfite cannot be decomposed, and steam consumption is very large. Therefore, the industrialization of the process has always been unachievable. On the basis of this process, a suggestion is that calcium oxide (or calcium hydroxide) is added to the organic acid-organic acid salt buffer solution, such that unregenerated sodium sulfite is converted to calcium sulfite, which precipitates and is separated, thus the solution is thoroughly regenerated. The regenerated organic acid-organic acid salt buffer solution is recycled for use, but the actual desulfurization agent in the process is still calcium oxide (or calcium hydroxide). As the solution contains some calcium ions, precipitation may occur during desulfurization, clogging pipelines and devices.

At present, the denitration process mainly used in the actual production is selective catalytic reduction (SCR) or selective non-catalytic reduction (SNCR).

In selective catalytic reduction (SCR), a catalytic bed or system is utilized to process a flue gas stream, wherein ammonia or urea is injected into the flue gas and mixed, then the mixture is passed through a catalyst layer, and NOx is selectively converted (reduced) to $N_2$ and $H_2O$. SCR method is currently the most proven denitration technology with the highest denitration efficiency. The first demonstration project of the SCR system was established in Shimoneski power plant in Japan in 1975, afterwards the SCR technology was widely applied in Japan. In Europe, there have been successful application experiences from more than 120 large-scale devices, and the $NO_X$ removal rate can reach 80%-90%. So far, there are approximately 170 sets of devices in Japan, power plants with a capacity of close to 100 GW have installed such apparatus, and US government also uses the SCR technology as the main technology for the main power plants to control $NO_X$. It is reported that the SCR method has currently become a relatively proven mainstream technology for denitration in power plants at home and abroad. The principle of flue gas denitration by the SCR method is as follows: under the catalysis of catalyst with $TiO_2$ and $V_2O_5$ as the main components and at a temperature of 280-400° C., or under the catalysis of catalyst with $TiO_2$, $V_2O_5$ and MnO as the main components and at a temperature of higher than 180° C., ammonia is sprayed into the flue gas, and NO and $NO_2$ are reduced to $N_2$ and $H_2O$, to achieve the purpose of denitration.

The SNCR denitration technology is a selective non-catalytic reduction technology without the use of catalysts, wherein at a temperature in the range of 850-1100° C., an amino-containing reducing agent (such as aqueous ammonia, urea solution, etc.) is sprayed into a furnace, and NO and $NO_2$ in the flue gas are reduced to $N_2$ and $H_2O$, thus the purpose of denitration is achieved. However, $NO_X$ removal rate of the industrial SNCR system is only 30-70%.

Both in SCR and SNCR denitration processes, ammonia consumption is relatively large. As the flue gas contains about 4%-9% $O_2$, ammonia gas or amino-containing urea will react with $O_2$ to produce $NO_X$, ammonia is thus consumed, meanwhile ammonia reacts incompletely, some ammonia is discharged into atmosphere together with the flue gas, and the loss of ammonia increases, resulting in the phenomenon of secondary pollution. A large quantity of fossil fuels is consumed during ammonia production, and a large quantity of waste gases, waste residues and waste water is produced, which is a severe process of environmental pollution, thus the use of ammonia should be avoided as far as possible.

There are also some drawbacks in the existing methods for removing NO from flue gases by SCR and SNCR. For the NO removal methods with ammonia as the reducing agent, ammonia, urea or aqueous urea solution is generally used as the source of the reducing agent. Excessive injection of ammonia or urea will lead to the so-called ammonia penetration, and the discharged ammonia is even more harmful than the discharged $NO_X$. The oxidation of excessive ammonia may lead to the formation of $NO_X$, and the transportation and storage of ammonia reducing agent have high requirements for safety and environmental protection. In addition, the catalyst used in the process of denitration will suffer from impingement and abrasion by high-concentration smoke and contamination by impurities in fly ashes. Excessively high temperature of flue gas will lead to catalyst sintering and deactivation, and the presence of $SO_2$ will lead to a rapid decline in catalyst activity.

Both in SCR and SNCR denitration processes, ammonia consumption is relatively large. As the flue gas contains about 4%-9% $O_2$, ammonia gas will react with $O_2$ to produce $NO_X$, ammonia is thus consumed, meanwhile ammonia reacts incompletely, some ammonia is discharged into atmosphere together with the flue gas, and the loss of ammonia increases, resulting in the phenomenon of secondary pollution. A large quantity of fossil fuels is consumed during ammonia production, and a large quantity of waste gases, waste residues and waste water is produced, which is a severe process of serious environmental pollution, thus the use of ammonia should be avoided as far as possible.

Many researchers at home and abroad propose to use ozone for simultaneously oxidizing $SO_2$ and NO in a flue gas to $SO_3$ and $NO_2$, and then lime/limestone, sodium hydroxide, etc. are used for absorption, thus achieving the effect of simultaneous removal of $SO_2$ and NO. However, since ozone-generating device is very expensive, a great investment is required; and ozone production cost is very high, that for the oxidation of 1 mole of $SO_2$ to $SO_3$ or of 1 mole of NO to $NO_2$, the ozone consumption required is 1.5-3 moles, respectively, while for producing 1 kg of ozone, about 10 kWh of electricity and 10-20 kg of pure oxygen are to be consumed, respectively; the energy consumption is large, the expenditure is high, and the investment is great, making the large-scale industrialization of flue gas desulfurization and denitration by ozone unachievable currently.

CN101352645A discloses a denitration process by catalytic oxidation, wherein the catalyst uses $TiO_2$ or $ZrO_2$—$TiO_2$ as the carrier and Co as the active component. NO is oxidized to water-soluble $NO_2$ by the oxygen contained in the flue gas itself, and then an alkaline solution is used for absorption and nitrogen oxides are thus removed.

CN1768902A discloses a boiler flue gas denitration method, wherein ozone $O_3$ is sprayed into a low-temperature section in a temperature range of 110-150° C. of the boiler flue, and nitric oxide NO in the boiler flue gas is oxidized to water-soluble nitrogen oxides of high valences, such as $NO_2$, $NO_3$ or $N_2O_5$; the molar ratio of the sprayed ozone $O_3$ to NO in the boiler flue gas is 0.5-1.5, and then the nitrogen oxides in the flue gas are removed by washing with an alkaline aqueous solution. However, in actual use, this technology has relatively low denitration efficiency and very high ozone consumption. To meet emission standards, its operating cost is particularly high, and enterprises cannot afford it, so large-scale industrialization of this technology has always been unachievable.

SUMMARY OF INVENTION

The present invention provides a flue gas desulfurization-denitration agent, which is formed by mixing a polyol and/or a polymeric polyol, a polycarboxylic acid and an alkaline substance together, then heating to above 90° C. and polymerizing. Said polyol and/or polymeric polyol, polycarboxylic acid and alkaline substance are mixed and subjected to condensation and/or polymerization, a hydroxyl group is condensed with a hydroxyl group or a hydroxyl group is condensed with a carboxyl group to lose one water molecule, thus a macromolecular or high molecular ether and/or ester is formed, and at the same time, the carboxyl group in the molecule will further combine with the alkaline substance.

Wherein, said polyol refers to an organic compound containing two or more hydroxyl groups in the molecule (including phenols), such as ethylene glycol, propylene glycol, 1,2,3-propanetriol (glycerol), 1,2 (or 1,3 or 1,4 or 2,3)-butanediol, 1,4-butylene diol, pentanediol, neo-isopentyldiol, isopentyldiol, 1,5-pentanediol, 1,6-hexanediol, benzenediol, 1,2,4-butanetriol, isobutanetriol, pentanetriol, isopentanetriol, benzenetriol, pentaerythritol, pentanetetraol, isopentanetetraol, butanetetraol, gallic acid, tannin, and the like.

Said polymeric polyol is a high molecular or macromolecular substance, wherein a hydroxyl group in one polyol molecule is condensed with a hydroxyl group in another polyol molecule. One water molecule is lost and an ether bond is thus formed, and such molecule as linked by the ether bond is called a polymeric polyol, such as polyethylene glycol, polypropylene glycol, polybutylene glycol, polypropanol and polybutanol, polyethylene glycol monomethyl ether, polyethylene glycol dimethyl ether, polyethylene glycol monoethyl ether, polyethylene glycol diethyl ether, and the like.

Said polycarboxylic acid is a compound at least containing two or more carboxyl groups in the same molecule, such as ethanedioic acid, propanedioic acid, butanedioic acid, aminoethanedioic acid, nitrilotriacetic acid, EDTA, tartaric acid, tannin acid, polygallic acid, citric acid, and the like.

Said alkaline substance comprises an inorganic alkaline substance and/or an organic alkaline substance. Said inorganic alkaline substance includes alkali metal, alkali earth metal or transition metal hydroxide, carbonate, carboxylate, complex, and ammonia; preferably hydroxide and carbonate containing Li, Na, K, Mg or Ca. Said organic alkaline substance is mainly an organic amine, which is selected from aliphatic amines, aromatic amines and alkylol amines. For example, the aliphatic amine is selected from methylamine, dimethylamine, trimethylamine, monoethylamine, diethylamine, triethylamine, monopropylamine, dipropylamine, tripropylamine, n-propylamine, isopropylamine, monobutylamine, dibutylamine, tributylamine, n-butylamine, sec-butylamine, isobutylamine, t-butylamine, ethylenediamine, propylenediamine, hexamethylenediamine, triethylenediamine, diethylenetriamine, triethylenetetramine, tetraethylenepentamine, polyethylenepolyamine, cyclopentylamine, cyclohexylamine, cycloheptylamine; the aromatic amine is selected from aniline, N-methylaniline, N-ethylaniline, N-propylaniline, N-butylaniline, N,N-dimethylaniline, N,N-diethylaniline, N,N-dipropylaniline, N,N-dibutylaniline, phenylenediamine, α-naphthylamine, halogenated aniline, nitroaniline, sulfoaniline; the alkylol amine is selected from monomethanolamine, dimethanolamine, trimethanolamine, monoethanolamine, diethanolamine, triethanolamine, N,N-dimethylethanolamine, N,N-diethylethanolamine, N,N-diisopropylethanolamine, N-methyldiethanolamine (MDEA), monopropanolamine, dipropanolamine, tripropanolamine, isopropanolamine, diisopropanolamine, triisopropanol amine, monobutanolamine, dibutanolamine, tributanolamine, N-hydroxyethylethylenediamine, N,N'-dihydroxyethylethylenediamine, N,N-dihydroxyethylaniline, N-ethyl-N-hydroxyethylaniline, N-methyl-N-hydroxyethylaniline, o-aminophenol, m-aminophenol, p-aminophenol, 2,4,6-tris(dimethylaminomethyl)phenol, 3-diethylaminophenol, 2-amino-5-nitrophenol, ammonia cefotaxime acid, N-methylpyrrolidinol, 2,4-diamino-6-hydroxypyrimidine, cyanuric acid, 2-(2'-hydroxy-5'-methylphenyl)benzotriazole, gamma acid, J acid, phenyl J acid, Chicago acid and its salts, H acid and its salts, di-J acid, scarlet acid and its salts, and the like.

Said desulfurization-denitration agent is a kind of macromolecular or high molecular ether and/or ester formed by mixing a polyol and/or a polymeric polyol, a polycarboxylic acid and an alkaline substance according to a certain proportion, then heating to above 90° C., and carrying out esterification and/or etherification, wherein the proportion is such that the molar ratio of the polyol and/or polymeric polyol:polycarboxylicacid:alkaline substance is 10:0.5-2:0.1-3, preferably 1:0.7-1:0.3-2, more preferably 1:0.9-1.3:0.5-1.5, very preferably 1:0.9-1.1:0.5-1.2, and most preferably 1:1:0.5-1.

A desulfurization-denitration solution of the present invention is formed by adding the desulfurization-denitration agent of the present invention to a solution composed of ethylene glycol and/or polyethylene glycol and/or water, wherein the desulfurization-denitration agent is used in an amount of 0.1-50 wt %, preferably 2-30 wt %, more preferably 5-25 wt %, and most preferably 10-20 wt %.

After in-depth studies, it has been found that, in the solution composed of EG (ethylene glycol) and/or PEG (polyethylene glycol) and/or water, this kind of macromolecular or high molecular ether and/or ester shown from the desulfurization-denitration agent of the present invention has the ability to selectively capture $SO_X$ and $NO_X$ (x is a natural number). The result of having selective capturing ability is obtained from combined effects, and the acting forces of these effects are weak forces, including ether bond acting force, ester bond acting force, complex bond acting force, buffer solution acting force, and the like. Also the $SO_X$ and $NO_X$ captured in the solution are readily released by gas (especially steam) stripping.

Said desulfurization-denitration solution can be used to simultaneously remove $SO_X$ and $NO_X$ from a waste gas, and can also be used to remove $SO_X$ (including $SO_2$ and $SO_3$) from the waste gas separately, or can be used to remove $NO_X$ (including NO and $NO_2$) from the waste gas separately.

In order to more clearly describe the material structures and synthetic methods in the present invention, the synthetic methods of the desulfurization-denitration agents of the present invention will be described below by taking only the following four reaction recipes as examples: ethylene glycol, citric acid and sodium hydroxide; polyethylene glycol, citric acid and sodium hydroxide; ethylene glycol, citric acid and N-methyldiethanolamine (MDEA); and polyethylene glycol, citric acid and N-methyldiethanolamine (MDEA).

The esterification process of ethylene glycol, citric acid and sodium hydroxide is as follows:

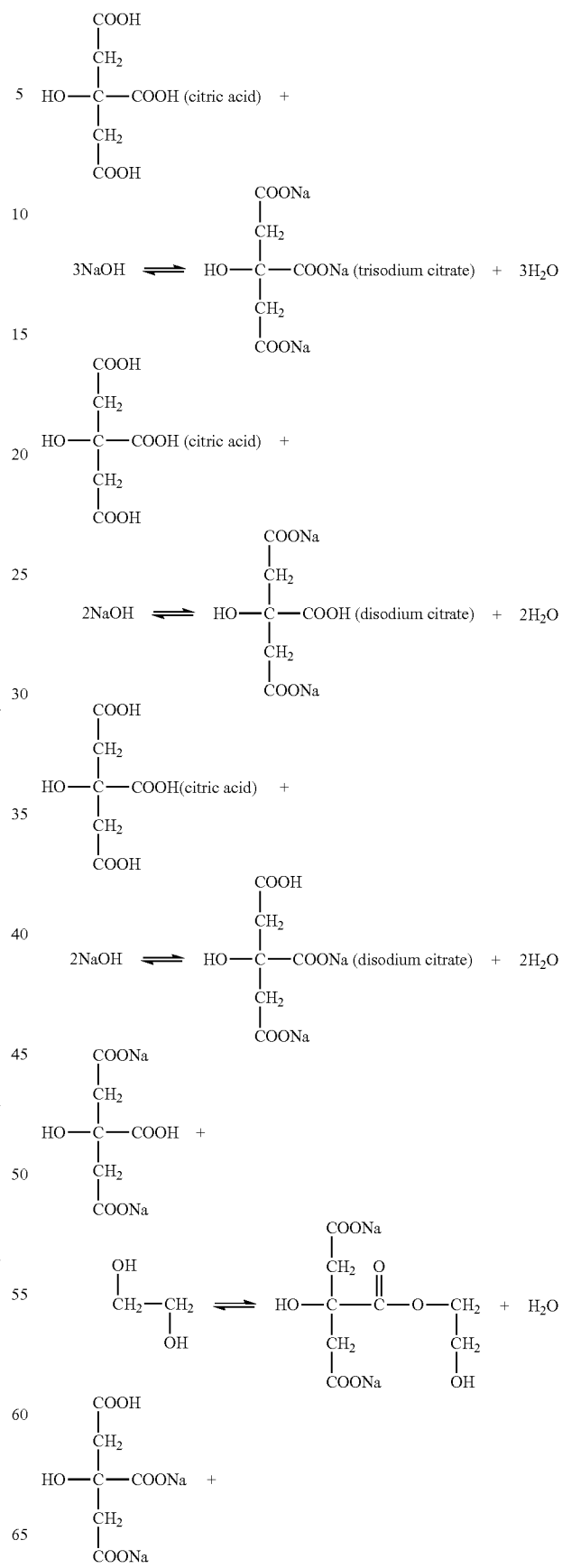

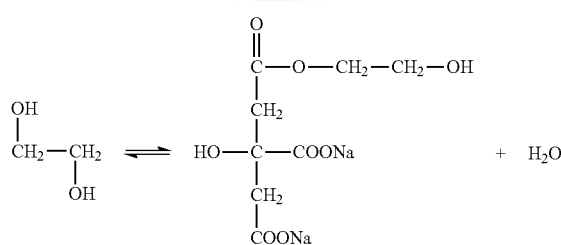
The esterification process of polyethylene glycol, citric acid and sodium hydroxide is as follows:
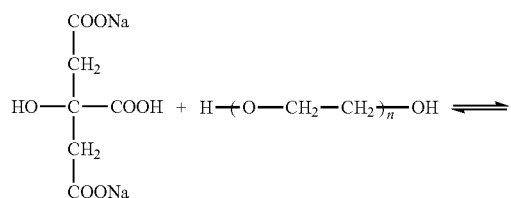
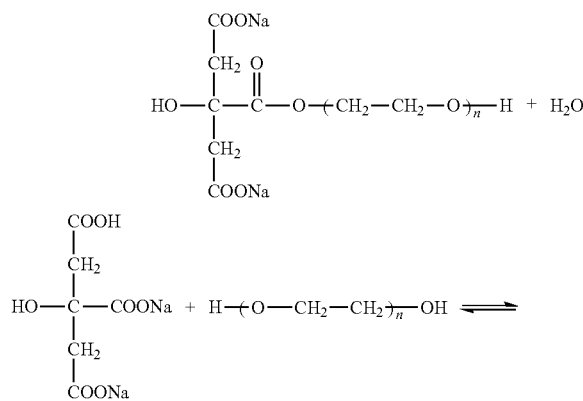
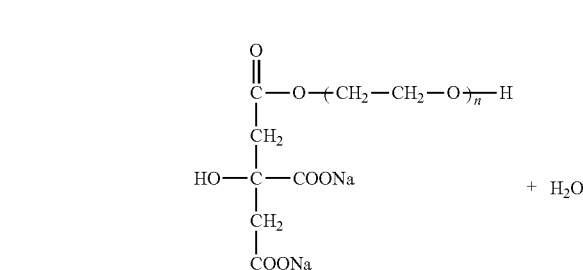
Ethylene glycol, citric acid and N-methyldiethanolamine (MDEA) can undergo the following etherification and esterification processes:
The etherification and combination processes are as follows:
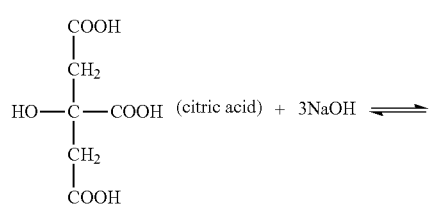
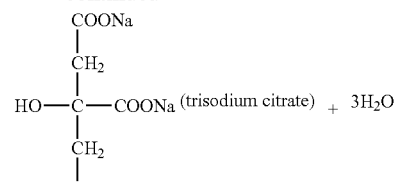
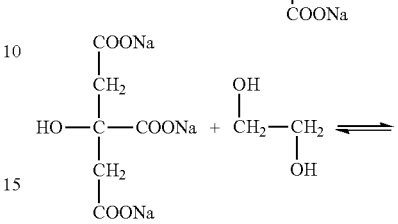
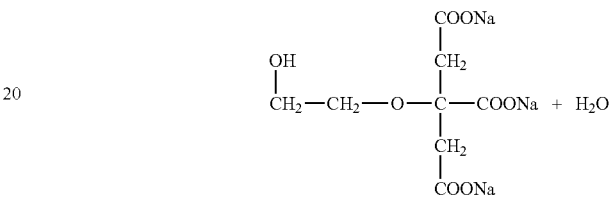
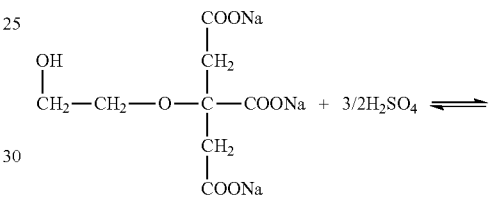
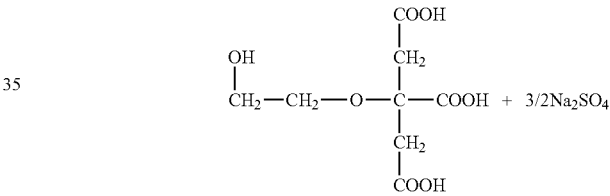
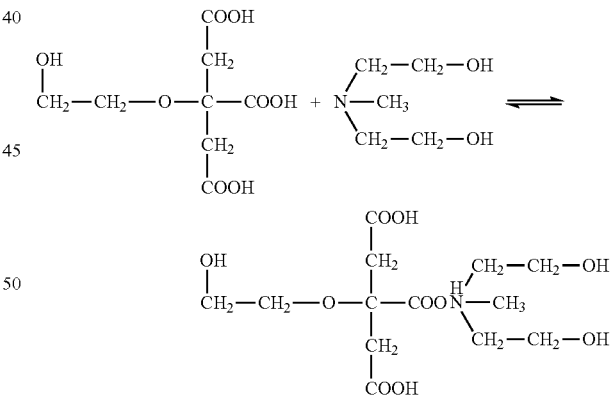
The esterification process is as follows:
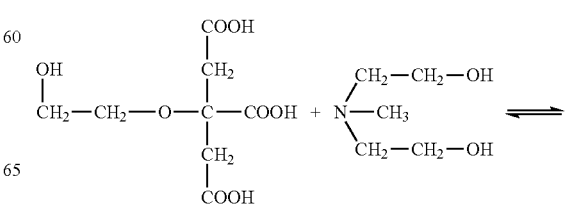

-continued

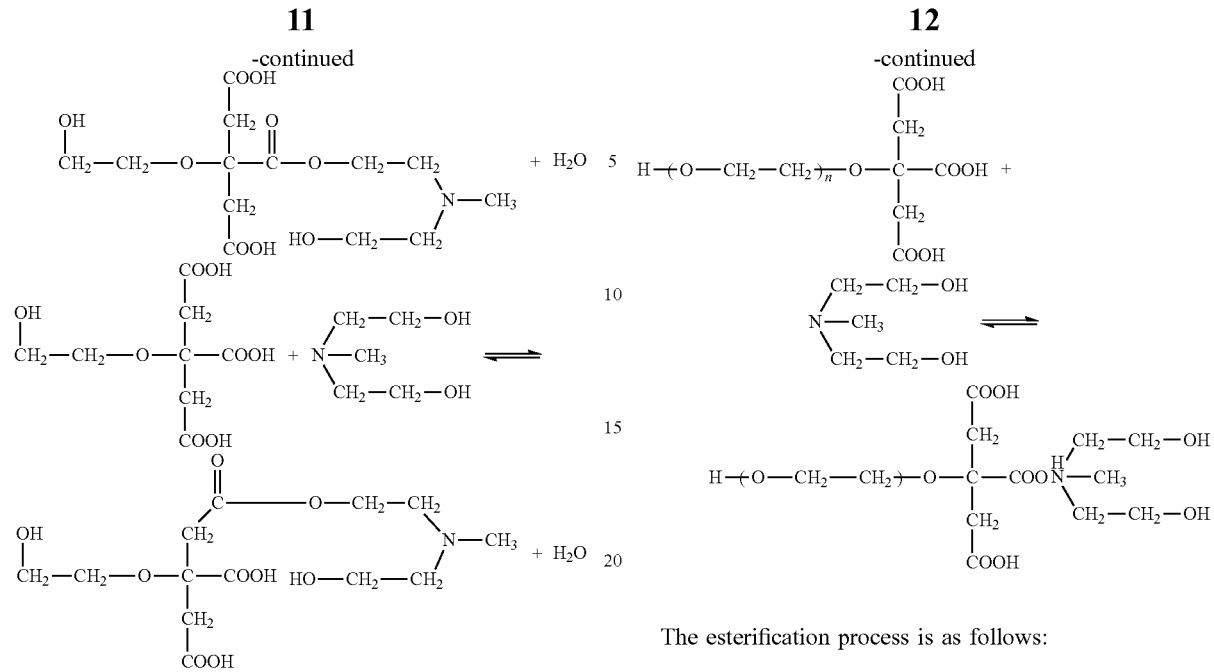

In addition, under the condition that NaOH and sulfuric acid are not used, N-methyldiethanolamine (MDEA) as an organic base can be used to replace the foregoing NaOH for reaction with citric acid, followed by etherification with ethylene glycol.

Polyethylene glycol, citric acid and N-methyldiethanolamine (MDEA) can undergo the following etherification and esterification processes:

The etherification and combination processes are as follows:

The esterification process is as follows:

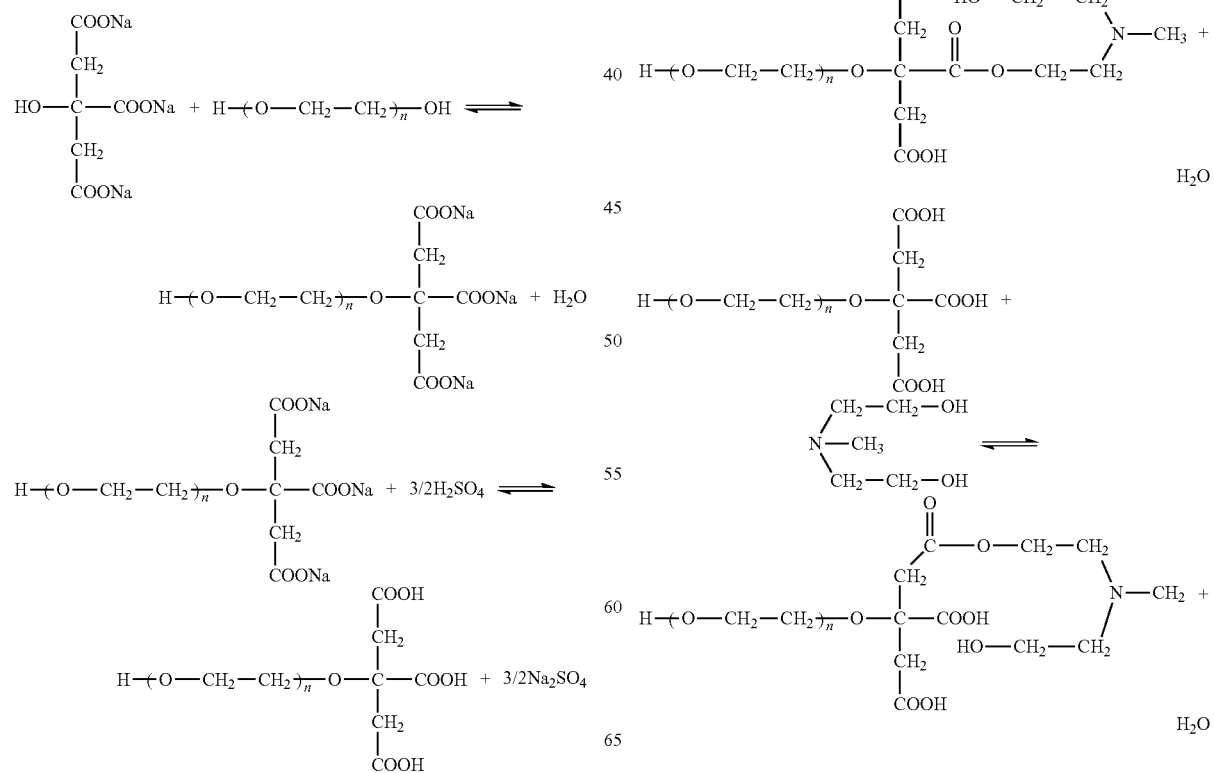

The synthetic recipes recited above are not intended to limit that the desulfurization-denitration agent of the present invention is only synthesized with ethylene glycol and/or polyethylene glycol, citric acid, sodium hydroxide and/or MDEA, rather it is a kind of macromolecular or high molecular ether and/or ester formed by mixing a polyol and/or a polymeric polyol, a polycarboxylic acid and an alkaline substance according to a certain proportion, then heating to above 90° C., and carrying out esterification and/or etherification, and the alkaline substance includes an inorganic alkaline substance and an organic alkaline substance. After the esterification and/or etherification, the liquid changes from colorless to yellowish-brown in color and becomes a viscous liquid, and the boiling point increases significantly.

When a polyol and/or a polymeric polyol, a polycarboxylic acid and an inorganic alkaline substance are used as synthetic raw materials, the reaction process is that the polyol and/or the polymeric polyol is condensed with a hydroxyl group-containing polycarboxylic acid and/or hydroxyl group or carboxyl group in the polycarboxylic acid to lose one water molecule, and then condensed to synthesize the macromolecular or high molecular ether and/or ester desulfurization-denitration agent. In a molecule of such a desulfurization-denitration agent, one carboxyl group bonds to a cation of the inorganic alkaline substance (the cation may be any of a hydrogen ion, an ammonium ion, a sodium ion, a potassium ion, a transition metal ion, and the like). The above polyol refers to an organic compound containing two or more hydroxyl groups in the molecule (including phenols), such as ethylene glycol, propylene glycol, 1,2,3-propanetriol (glycerol), (1,2 or 1,3 or 1,4 or 2,3)-butanediol, 1,4-butylene diol, neo-isopentyldiol, pentaerythritol, 1,5-pentanediol, 1,6-hexanediol, 1,2,4-butanetriol, butanetetraol, diethylene glycol diether, benzenediol, benzenetriol, gallic acid, tannin, and the like. Said polymeric polyol is a high molecular or macromolecular substance, wherein a hydroxyl group in one polyol molecule is condensed with a hydroxyl group in another polyol molecule. One water molecule is lost, thus an ether bond is formed. And such molecule as linked by the ether bond is called a polymeric polyol, such as polyethylene glycol, polypropylene glycol, polybutylene glycol, and the like. Said hydroxyl group-containing polycarboxylic acid is a compound containing at least one hydroxyl group and two or more carboxyl groups in the same molecule, such as tannin acid, polygallic acid, citric acid, hydroxy fatty polyacid, hydroxy terephthalic acid, hydroxyphthalic acid, hydroxyisophthalic acid, hydroxybenzenetricarboxylic acid, polyhydroxybenzenetricarboxylic acid, as well as other hydroxyaromatic polyacids and polyhydroxyaromatic polyacids. Said polycarboxylic acid is a compound containing at least two or more carboxyl groups in the same molecule, such as EDTA, ethanedioic acid, propanedioic acid, butanedioic acid, aminoethanedioic acid, nitrilotriacetic acid, fatty polyacid, terephthalic acid, phthalic acid, isophthalic acid, trimesic acid and other aromatic polyacids.

When a polyol and/or a polymeric polyol, a polycarboxylic acid and an organic alkaline substance are used as synthetic raw materials, the reaction process is that the polyol and/or the polymeric polyol is condensed with a hydroxyl group-containing polycarboxylic acid and/or hydroxyl group or carboxyl group in the polycarboxylic acid to lose one water molecule, and then condensed to synthesize the macromolecular or high molecular ether and/or ester desulfurization-denitration agent. In a molecule of such a desulfurization-denitration agent, one carboxyl group bonds to the organic alkaline substance in the form of an organic cation. When the organic alkaline substance contains a hydroxyl group, the hydroxyl group will also undergo esterification with the carboxyl group in the macromolecular or high molecular ether and/or ester to form an ester. Said organic alkaline substance is an organic amine, which is selected from aliphatic amines, aromatic amines and alkylol amines. Said aliphatic amine is selected from methylamine, dimethylamine, trimethylamine, monoethylamine, diethylamine, triethylamine, monopropylamine, dipropylamine, tripropylamine, n-propylamine, isopropylamine, monobutylamine, dibutylamine, tributylamine, n-butylamine, sec-butylamine, isobutylamine, t-butylamine, ethylenediamine, propylenediamine, hexamethylenediamine, triethylenediamine, diethylenetriamine, triethylenetetramine, tetraethylenepentamine, polyethylenepolyamine, cyclopentylamine, cyclohexylamine, cycloheptylamine; the aromatic amine is selected from aniline, N-methylaniline, N-ethylaniline, N-propylaniline, N-butylaniline, N,N-dimethylaniline, N,N-diethyl aniline, N,N-dipropylaniline, N,N-dibutylaniline, phenylenediamine, α-naphthylamine, halogenated aniline, nitroaniline, sulfoaniline; the alkylol amine is selected from monomethanolamine, dimethanolamine, trimethanolamine, monoethanolamine, diethanolamine, triethanolamine, N,N-dimethylethanolamine, N,N-diethylethanolamine, N,N-diisopropylethanolamine, N-methyldiethanolamine (MDEA), monopropanolamine, dipropanolamine, tripropanolamine, isopropanolamine, diisopropanolamine, triisopropanolamine, monobutanolamine, dibutanolamine, tributanolamine, N-hydroxyethylethylenediamine, N,N'-dihydroxyethylethylenediamine, N,N-dihydroxyethylaniline, N-ethyl-N-hydroxyethylaniline, N-methyl-N-hydroxyethylaniline, o-aminophenol, m-aminophenol, p-aminophenol, 2,4,6-tris(dimethylaminomethyl)phenol, 3-diethylaminophenol, 2-amino-5-nitrophenol, ammonia cefotaxime acid, N-methylpyrrolidinol, 2,4-diamino-6-hydroxypyrimidine, cyanuric acid, 2-(2'-hydroxy-5'-methylphenyl)benzotriazole, gamma acid, J acid, phenyl J acid, Chicago acid and its salts, H acid and its salts, di-J acid, scarlet acid and its salts, and the like.

Compared with the conventional desulfurization and/or denitration agent (e.g., calcium carbonate, calcium oxide, ammonia and/or urea, metal oxides, etc.), the desulfurization-denitration agent of the present invention has the following advantages: (1) the conventional desulfurization and/or denitration agent reacts irreversibly with sulfur dioxide or nitrogen oxides, the by-products thereof are calcium sulfate and calcium sulfite or ammonium sulfate and ammonium sulfite, nitrogen gas and water, while the flue gas desulfurization-denitration agent of the present invention reacts reversibly with sulfur dioxide and/or nitrogen oxides via weak bonding. After regeneration by gas stripping, the desulfurization-denitration agent restores the original structure and releases sulfur dioxide and/or nitrogen oxides. Also the by-products are high-purity sulfur dioxide and/or nitrogen oxides (or nitrates), and these by-products are important chemical raw materials with wide markets and great application values; (2) the desulfurization agent used in the conventional wet process is calcium carbonate, calcium oxide and/or ammonia; when calcium carbonate is used as the desulfurization agent, a large consumption of calcium carbonate is required, whereas calcium carbonate mining will seriously damage the environment, causing water loss and soil erosion, landslides and the destruction of ecological environment; when calcium oxide is used as the desulfurization agent, a large consumption of calcium oxide is required, whereas calcium oxide is obtained by calcination of calcium carbonate and coal, a large scale calcium carbonate mining is also needed, and coal consumption is large, resulting in serious secondary pollution, causing water loss and soil erosion, landslides and the destruction of ecological environment; when ammonia is used as the desulfurization agent, the ammonia production process itself is a serious process with heavy pollution, high energy consumption, flammability and explosiveness, and as ammonia is volatile, a large quantity of ammonia will be carried by the flue gas into the environment, causing serious phenomenon of secondary pollution. The flue gas desulfurization-denitration agent of the present invention is a high-boiling, non-toxic and harmless ether and/or ester-based polymer compound, it has high safety level, excellent chemical stability and high boiling point, and can be fully recycled for use without the consumption of calcium carbonate and/or calcium oxide and/or ammonia and without the phenomenon of any secondary pollution; (3) the conventional wet desulfurization agent is calcium carbonate or calcium oxide, a large quantity of mineral calcium carbonate or calcium oxide is required, and tiny hydrophilic and non-hydrophilic particles (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, mineral particles such as silica particles, mullite particles, silicate particles, phosphate particles, and the like) contained in its slurry are discharged into atmosphere together with the flue gas, while sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomena of haze and atmospheric photochemical reactions, and causing serious environmental pollution. When the flue gas desulfurization-denitration agent of the present invention is used for flue gas or waste gas desulfurization-denitration, these phenomena will not happen. If the present invention is widely applied, the phenomena of haze and atmospheric photochemical reactions can be eliminated; (4) the conventional desulfurization agent or denitration agent is for one-time use, so the operating cost is high, and economic benefits cannot be brought about, while the flue gas desulfurization-denitration agent of the present invention is low in operating cost, and the efficiency of desulfurization and denitration is high, and meanwhile wastes are converted into valuable chemical raw materials, resulting in greater economic, social and environmental benefits; (5) the conventional wet desulfurization and/or denitration agent is suitable for the desulfurization and/or denitration of a gas with a lower content of sulfur or a low content of nitrogen oxides, while the flue gas desulfurization-denitration agent of the present invention can be used for the desulfurization and/or denitration of a gas with a low content of sulfur and/or low content of nitrogen oxides, and can also be used for the desulfurization and/or denitration of a gas with a high content of sulfur and/or a high content of nitrogen oxides. At the same time, with the flue gas desulfurization-denitration agent of the present invention, the purifying degree of desulfurization-denitration is high, and the total content of sulfur and nitrogen oxides in the gas can be reduced stably to below 30 mg/m$^3$, and the boiling point of the solution is high, the loss thereof is less, the gas to liquid ratio of desulfurization-denitration is large, the energy consumption is low, while the operating cost is low, and the operation is simple.

The flue gas desulfurization-denitration agent of the present invention has a wide application in industry, it can be used for simultaneous removal of sulfur dioxide and nitrogen oxides from a gas, and can also be used for removal of sulfur dioxide from the gas alone, or can be used for removal of nitrogen oxides from the gas alone. It can be used for desulfurization and/or denitration of flue gases, incineration gases, coke-oven gases, synthetic waste gases from dyestuff plants, effluent gases from chemical fiber plants, as well as other industrial feed gases or waste gases containing $SO_X$. The contents of total sulfur and/or the contents of total nitrogen oxides in the above gases containing sulfur and/or containing nitrogen oxides are less than 99.9% (by volume).

In order to verify the practicability of the desulfurization-denitration agent of the present invention, a process and apparatus for simulated flue gas desulfurization-denitration as shown in FIG. 1 were designed, and the desulfurization-denitration agent of the present invention was dissolved in ethylene glycol or polyethylene glycol respectively to form the desulfurization-denitration solution. Desulfurization and/or denitration experiments were carried out in the process and apparatus shown in FIG. 1, and the specific experimental methods are described in the specific embodiments.

DESCRIPTION OF DRAWING

FIG. 1 is a schematic diagram showing a process and apparatus for simulated flue gas desulfurization-denitration.

In FIG. 1: 1 represents a booster fan, 2 represents an absorption tower, 3 represents a desulfurization pump, 4 represents a rich liquid pump, 5 represents a lean liquid tank, 6 represents a lean liquid pump, 7 represents a cooler, 8 represents a heat exchanger, 9 represents a rich liquid heater, 10 represents a regeneration tower, 11 represents a concentration tower, 12 represents a flue gas before purification, 13 represents a flue gas after purification, 14 represents a lean liquid, 15 represents a rich liquid, 16 represents a regenerated desorbed gas, 17 represents a stripping steam, 18 represents a concentrated gas of sulfur dioxide and/or nitrogen oxides, 19 represents a condensed hot water, 20 represents a cooling water, and 21 represents a heating medium. For the meanings represented by circled symbols in the FIGURE: $F_1$, $F_2$, $F_3$ and $F_4$ respectively represent the flow rate of the flue gas 12 before purification, the flow rate of the desulfurized lean liquid 14, the flow rate of steam entering the regeneration tower 10 and the flow rate of steam entering the concentration tower 11; $A_1$ represents the composition of the flue gas before purification 12, $A_2$ represents the composition of the flue gas after purification 13, $A_3$ represents the composition of the concentrated gas of sulfur dioxide and/or nitrogen oxides 18, $A_4$ represents the content of $SO_2$ and NO in the rich liquid 15 (including pH), $A_5$ represents the content of $SO_2$ and NO in the lean liquid 14 (including pH), and $A_6$ represents the content of $SO_2$ and NO in the condensed hot water 19; $P_1$ represents the bottom pressure of the absorption tower 2, $P_2$ represents the top pressure of the absorption tower 2, $P_3$ represents the pressure in the regeneration tower 10, $P_4$ represents the pressure of stripping steam 17, and $P_5$ represents the pressure in the concentration tower 11; $T_1$ represents the temperature at the bottom of the absorption tower 2, $T_2$ represents the temperature at the top of the absorption tower 2, $T_3$ represents the temperature in the regeneration tower 10, $T_4$ represents the temperature of the stripping steam 17, $T_5$ represents the temperature in the concentration tower 11, and $T_6$ represents the temperature of the concentrated gas of sulfur dioxide and/or nitrogen oxides 18.

DETAILED DESCRIPTION

The actual purification effect of the desulfurization-denitration agent of the present invention will be described below in conjunction with specific embodiments. The embodiments are intended to better illustrate the present invention, and should not be construed as limiting the claims of the present invention.

The operation method is as follows:

A desulfurization-denitration solution (lean liquid 14) is firstly formed by dissolving a desulfurization-denitration agent of the present invention in ethylene glycol or polyethylene glycol, and the solution is injected into a lean liquid tank 5. All apparatus are activated for operation. The operation method is as follows:

As shown in FIG. 1: a flue gas before purification 12 with a temperature below 80° C. (the optimal temperature is below 35° C.) is pressurized by a booster fan 1 and then enters an absorption tower 2 from the bottom, while a lean liquid 14 enters the absorption tower 2 from the top. In the absorption tower 2, the flue gas before purification 12 contacts directly with the lean liquid 14. By this time, sulfur dioxide and/or nitrogen oxides and a small amount of carbon dioxide in the flue gas before purification 12 are absorbed by the lean liquid 14, the flue gas before purification 12 with sulfur dioxide and/or nitrogen oxides and a small amount of carbon dioxide being absorbed is converted to a flue gas after purification 13, and flows out from the top of the absorption tower 2 and is discharged into atmosphere, while contents $A_1$ and $A_2$ of sulfur dioxide and/or nitrogen oxides, carbon dioxide and oxygen in the flue gas before purification 12 and the flue gas after purification 13 are analyzed online. The lean liquid 14 with absorbed sulfur dioxide and/or nitrogen oxides and a small amount of carbon dioxide is converted to a rich liquid 15, flows out from the bottom of the absorption tower 2, is pressurized by a rich liquid pump 4, and is subjected to heat exchange through the shell pass of a heat exchanger 8 with the hot lean liquid 14 from a regeneration tower 10 to raise the temperature, and is then heated by a hot medium 21 to above 90° C. through a rich liquid heater 9. The rich liquid 15 with a temperature higher than 90° C. enters the regeneration tower 10 from the upper end, while a stripping steam 17 enters the regeneration tower 10 from the bottom. In the regeneration tower 10, the rich liquid 15 with a temperature higher than 90° C. is brought into direct contact with the stripping steam 17. By this time, the sulfur dioxide and/or nitrogen oxides and a small amount of carbon dioxide in the rich liquid 15 are desorbed, and enter into the stripping steam 17 to be mixed into a regenerated desorbed gas 16, which flows out from the top of the regeneration tower 10. After releasing sulfur dioxide and/or nitrogen oxides and a small amount of carbon dioxide, the rich liquid 15 with a temperature higher than 90° C. is converted to the hot lean liquid 14 with a temperature higher than 90° C., which flows out from the bottom of the regeneration tower 10 and is subjected to heat exchange through the tube pass of the heat exchanger 8 with the rich liquid 15 in the shell pass sent from the rich liquid pump 4 to lower the temperature. The lean liquid 14 with lowered temperature moves along the tube pass of a cooler 7, is cooled to room temperature by a cooling water 20 in the shell pass, and is pressurized by a lean liquid pump 6 and sent to the lean liquid tank 5. Then, the lean liquid 14 in the lean liquid tank 5 is pressurized by a desulfurization pump 3 and sent to the absorption tower 2 for desulfurization and/or denitration. The desulfurization-denitration solution works in such a way: the lean liquid 14 is converted to the rich liquid 15 after it absorbs sulfur dioxide and/or nitrogen oxides and a small amount of carbon dioxide in the absorption tower 2, whereas in the regeneration tower 10, the rich liquid 15 is heated, gas stripped and/or vacuum regenerated and again converted to the lean liquid 14, and the lean liquid 14 is again recycled for use, and it cycles continuously like this. The regenerated desorbed gas 16 flowing out from the top of the regeneration tower 10 enters a concentration tower 11 from the middle, and contacts with the distilled water condensed from the upper end of the concentration tower 11. In the condensing section of the concentration tower 11, water vapor in the regenerated desorbed gas 16 is condensed by the cooling water 20. A concentrated gas 18 of sulfur dioxide and/or nitrogen oxides comprised of non-condensing mixed gas of sulfur dioxide and/or nitrogen oxides and a small amount of carbon dioxide and the like flows out from the concentration tower 11, and can be recovered as a raw material gas, while condensed distilled water contains sulfur dioxide and/or nitrogen oxides and the like and continues flowing to the bottom of the concentration tower 11, and contacts with the stripping steam 17 coming from the bottom. Sulfur dioxide and/or nitrogen oxides and other gases in the distilled water are stripped and desorbed by the stripping steam 17, such that the condensed water is essentially free of sulfur dioxide and/or nitrogen oxides and other gases, reaching the standard of condensed hot water 19 for recovery, and can be recycled for use.

With respect to the process and apparatus for simulated flue gas desulfurization-denitration shown in FIG. 1, the specifications for various apparatus are as follows:

Absorption tower 2: φ219×4, total height 7.2 m, 4-layer packing, each 1 m high, 316L stainless steel material;

Lean liquid tank 5: φ450×3, total height 2.0 m, 316L stainless steel material;

Cooler 7: φ159×3, tube φ10×1, length 1.5 m, total heat exchange area 3.9 $m^2$, 316L stainless steel material;

Heat exchanger 8: φ159×3, 2 units, tube φ10×1, length 1.5 m, heat exchange area 2×3.9 $m^2$, φ219×3, 1 unit, tube φ6×1, length 1.4 m, heat exchange area 9.63 $m^2$, total heat exchange area 2×3.9+9.63=17.43 $m^2$, 316L stainless steel material;

Rich liquid heater 9: φ159×3, tube φ32×1, length 0.9 m, total heat exchange area 1.63 $m^2$, titanium material;

Regeneration tower 10: φ219×4, total height 5.57 m, upper section with one layer of packing with a height of 1.5 m, lower end is empty tower, 316L stainless steel material;

Concentration tower 11: φ159×4, total height 6.2 m, upper end is titanium tube condenser, middle section with one layer of packing with a height of 1.5 m, lower section with one layer of packing with a height of 2.0 m, 316L stainless steel material.

Booster fan 1: Model 2HB710-AH37, air volume 318 $m^3$/hr, air pressure −290 to 390 mbar (−29 kPa to 39 kPa), Shanghai Likai Mechanical & Electrical device Co., Ltd.;

Rich liquid pump 4, desulfurization pump 3 and lean liquid pump 6: Models IHG25-160, flow rate 4.0 $m^3$/hr, pumping head 32 m, 1.5 KW, 1 unit for each, 316L stainless steel material, Shanghai Changshen Pump Manufacturing Co., Ltd.;

Flue gas flowmeter: Model LZB-50 glass rotor flowmeter, measuring range: 50-250 $m^3$/hr, Jiangyin Keda Instrument Factory;

Desulfurization-denitration solution flowmeter: rich liquid pump, lean liquid pump and desulfurization pump outlet liquid flowmeter, Model LZB-32S glass pipeline flowmeter, measuring range: 0.4-4 m³/hr, Jiangyin Keda Instrument Factory;

Steam flowmeter (for gas stripping regeneration tower): Model LUGB-2303-$P_2$ vortex flowmeter, measuring range: 8-80 m³/hr, Beijing Bangyu Chengxin Industrial Control Technology Development Co., Ltd.;

Steam flowmeter (for concentration tower): Model GHLUGB-25 vortex flowmeter, measuring range: 10-60 m³/hr, Tianjin Guanghua Kaite Flow Meter Co., Ltd.;

For the inlet and outlet gases of the absorption tower 2 as well as the gases desorbed from the concentration tower 11, all components were on-line analyzed by continuous flue gas analyzer, wherein the contents of $SO_2$, NO and $O_2$ were analyzed by ultraviolet JNYQ-I-41 type gas analyzer, the content of $CO_2$ was analyzed by JNYQ-I-41C type infrared gas analyzer, manufactured by Xi'an Juneng Instrument Co., Ltd.; At the same time, the contents of $SO_2$, NO and $CO_2$ in the gas were analyzed and calibrated by chemical analysis method, and compared with values of instrumental analysis. In the chemical analysis method, the content of $SO_2$ in the gas was analyzed by iodometric method, the content of $CO_2$ in the gas was analyzed by barium chloride method, and the content of NO in the gas was analyzed by naphthyl ethylenediamine hydrochloride colorimetric method.

The contents of $SO_2$, NO and $CO_2$ in the lean liquid 14, the rich liquid 15 and the condensed hot water 19 were analyzed by chemical methods, in which: the content of $SO_2$ in the solution was analyzed byiodometric method, the content of $CO_2$ in the solution was analyzed by barium chloride method, the content of NO in the solution was analyzed by naphthyl ethylenediamine hydrochloride colorimetric method, and the pH of the solution was measured by electric potential pH meter.

Gas mixing was performed with air, $SO_2$, $NO/NO_2$ and $CO_2$, and the gas compositions are shown in the data records of each experimental step.

According to the desulfurization-denitration agent of the present invention, the following four desulfurization-denitration solutions were formulated for experiments, and the experimental results are as follows:

Solution 1: The desulfurization-denitration solution, composed of 15% (w/w) of desulfurization-denitration agent, 75% (w/w) of ethylene glycol and 10% (w/w) of water, said desulfurization-denitration agent was synthesized by mixing ethylene glycol, citric acid and potassium hydroxide (1:1:1 molar ratio).

The synthetic method of this desulfurization-denitration agent was as follows: 48 Kg citric acid was first dissolved in 50 Kg distilled water, and then 23.5 Kg potassium hydroxide was added slowly to the aqueous solution of citric acid while slowly cooling, such that the temperature did not exceed 50° C.; after thorough dissolution, a potassium citrate solution was formed, then 15.5 Kg ethylene glycol was added to the potassium citrate solution and uniform stirring was carried out; the mixture was heated to 90° C.-120° C. and reaction went for 3 hours to obtain 137 Kg reactant mixture, in which the desulfurization-denitration agent was 78 Kg, and water was 59 Kg. Then, 7 Kg water was evaporated under reduced pressure, leaving 130 Kg aqueous solution of desulfurization-denitration agent, in which the desulfurization-denitration agent was 78 Kg, and water was 52 Kg. Then, 390 Kg ethylene glycol was added to this 130 Kg aqueous solution of desulfurization-denitration agent, stirred and mixed, obtaining 520 Kg desulfurization-denitration solution composed of 15% (w/w) of desulfurization-denitration agent, 75% (w/w) of ethylene glycol and 10% (w/w) of water, and this desulfurization-denitration solution was used in the following test:

Operation was performed in accordance with the embodiment described above in the apparatus shown in FIG. 1 with this desulfurization-denitration solution, and the operating conditions were as follows:

$T_1$=36-40.4° C., $T_2$=30.3-31.9° C., $T_3$=120.7-121.9° C., $T_4$=not measured, $T_5$=not measured, and $T_6$=not measured;
$P_{1=6.65}$ kPa, $P_2$=not measured, $P_3$=0 kPa, and $P_5$=0 kPa;
$F_1$=40 m³/hr, $F_2$=0.232 m³/hr, $F_3$=not measured, and $F_4$=not measured.

Experiments were operated according to the procedures, below are the operating data taken from the dayshift on Apr. 12, 2014:

Gas composition before treatment $A_1$: $SO_2$: 690-838 ppm, $NO_X$: not measured,
$CO_2$: not measured, $O_2$: not measured.

Gas composition after treatment $A_2$: $SO_2$: 12.3-37 ppm, $NO_X$: not measured,
$CO_2$: not measured, $O_2$: not measured.
Desulfurization efficiency: 95.6%-98.24%.

Composition of gas released by regeneration $A_3$:
$SO_2$: not measured, $NO_X$: not measured,
$CO_2$: not measured, $O_2$: not measured.

Rich liquid composition $A_4$: $SO_2$: 0.81-1.06 g/L, $NO_X$: not measured, pH: 2.56-2.75.

Lean liquid composition $A_5$: $SO_2$: 0.51-0.89 g/L, $NO_X$: not measured, pH: 2.9-3.45.

Condensed hot water composition $A_6$: $SO_2$: not measured.

Solution 2: The desulfurization-denitration solution, composed of 15% (w/w) of desulfurization-denitration agent, 75% (w/w) of ethylene glycol and 10% (w/w) of water, said desulfurization-denitration agent was synthesized by mixing polyethylene glycol 400, citric acid and potassium hydroxide (1:1:1 molar ratio).

The synthetic method of this desulfurization-denitration agent was as follows: 24 Kg citric acid was first dissolved in 50 Kg distilled water, and then 11.75 Kg potassium hydroxide was added slowly to the aqueous solution of citric acid while slowly cooling, such that the temperature did not exceed 50° C.; after thorough dissolution, a potassium citrate solution was formed, then 50 Kg polyethylene glycol 400 was added to the potassium citrate solution and uniform stirring was carried out; the mixture was heated to 90° C.-120° C. and reaction went for 3 hours to obtain 135.75 Kg reactant mixture, in which the desulfurization-denitration agent was 81.25 Kg, and water was 54.5 Kg. Then, 404.25 Kg polyethylene glycol 400 was added to this 135.75 Kg aqueous solution of desulfurization-denitration agent, stirred and mixed, obtaining 540 Kg desulfurization-denitration solution composed of 15% (w/w) of desulfurization-denitration agent, 75% (w/w) of polyethylene glycol 400 and 10% (w/w) of water, and this desulfurization-denitration solution was used in the following test: Operation was performed in accordance with the embodiment described above in the apparatus shown in FIG. 1 with this desulfurization-denitration solution, and the operating conditions were as follows:

$T_1$=31.4-35.8° C., $T_2$=33.6-38.7° C., $T_3$=92.6-107.9° C., $T_4$=89.7-115.5° C., $T_5$=89.8-100.2° C., and $T_6$=29.6-46.1° C.;

$P_1$=not measured, $P_2$=not measured, $P_3$=not measured, and $P_5$=not measured;

$F_1$=95 m³/hr, $F_2$=0.238 m³/hr, $F_3$=3.5-24.9 m³/hr, and $F_4$=3.8-11.4 m³/hr.

Experiments were operated according to the procedures, below are the operating data taken from the nightshift on May 13, 2014.

Gas composition before treatment $A_1$: $SO_2$: 683.2-1083.7 ppm, $NO_X$: not measured,
$CO_2$: 3.14-3.78% (v/v), $O_2$: not measured.

Gas composition after treatment $A_2$: $SO_2$: 5.8-10.9 ppm, $NO_X$: not measured,
$CO_2$: 3.27-3.92% (v/v), $O_2$: not measured.

Desulfurization efficiency: 98.49%-99.46%.

Composition of gas released by regeneration $A_3$:
$SO_2$: 79.98% (v/v), $NO_X$: not measured,
$CO_2$: not measured, $O_2$: not measured.

Rich liquid composition $A_4$: $SO_2$: 1.2233-1.9282 g/L, $NO_X$: not measured, pH: 3.65-3.92.

Lean liquid composition $A_5$: $SO_2$: 0.0622-0.2281 g/L, $NO_X$: not measured, pH: 3.94-4.02.

Condensed hot water composition $A_6$: $SO_2$: 0.0019-0.0031 g/L.

Solution 3: The desulfurization-denitration solution, composed of 15% (w/w) of desulfurization-denitration agent, 75% (w/w) of polyethylene glycol 200 and 10% (w/w) of water, said desulfurization-denitration agent was synthesized by mixing ethylene glycol, citric acid and N-methyldiethanolamine (MDEA) (1:1:1 molar ratio).

The synthetic method of this desulfurization-denitration agent was as follows: 48 Kg citric acid was first dissolved in 50 Kg distilled water, and then 29.75 Kg N-methyldiethanolamine (MDEA) was added slowly to the aqueous solution of citric acid while slowly cooling, such that the temperature did not exceed 50° C.; after thorough dissolution, a citric acid MDEA solution was formed, then 15.5 Kg ethylene glycol was added to the citric acid MDEA solution and uniform stirring was carried out; the mixture was heated to 90° C.-120° C. and reaction went for 3 hours to obtain 143.25 Kg reactant mixture, in which the desulfurization-denitration agent was 88.75 Kg, and water was 54.5 Kg. Then, 442.5 Kg ethylene glycol and 4.25 Kg distilled water was added to this 143.25 Kg aqueous solution of desulfurization-denitration agent, stirred and mixed, obtaining 590 Kg desulfurization-denitration solution composed of 15% (w/w) of desulfurization-denitration agent, 75% (w/w) of ethylene glycol and 10% (w/w) of water, and this desulfurization-denitration solution was used in the following test:

Operation was performed in accordance with the embodiment described above in the apparatus shown in FIG. 1 with this desulfurization-denitration solution, and the operating conditions were as follows:

$T_1$=30.6-36.5° C., $T_2$=21.6-28.2° C., $T_3$=125-127.1° C., $T_4$=123.8-127.1° C., $T_5$=103-118° C., and $T_6$=27.8-29.9° C.;

$P_{1=6.4}$-7 kPa, $P_{2=2.6}$-2.85 kPa, $P_{3=3.5}$-4.45 kPa, and $P_{5=0.95}$-1.55 kPa;

$F_1$=164 m³/hr, $F_2$=0.125 m³/hr, $F_3$=19.7-20.2 m³/hr, and $F_4$=0-4.2 m³/hr.

Experiments were operated according to the procedures, below are the operating data taken from the nightshift on Jan. 7, 2015.

Gas composition before treatment $A_1$: $SO_2$: 1366.5-1977 ppm, $NO_X$: not measured,
$CO_2$: 3.3-8% (v/v), $O_2$: 23.7-24.9% (v/v).

Gas composition after treatment $A_2$: $SO_2$: 6-8.5 ppm, $NO_X$: not measured,
$CO_2$: 3.0-7.7% (v/v), $O_2$: 20.7-21.6% (v/v).

Desulfurization efficiency: 99.39%-99.58%.

Composition of gas released by regeneration $A_3$:
$SO_2$: 89.9%-90.1% (v/v), $NO_X$: 0.1% (v/v),
$CO_2$: 1.5-2.9% (v/v), $O_2$: not measured.

Rich liquid composition $A_4$: $SO_2$: 3.959-6.331 g/L, $NO_X$: not measured, pH: 3.14-3.64.

Lean liquid composition $A_5$: $SO_2$: 0.446-0.522 g/L, $NO_X$: not measured, pH: 4.16-4.19.

Condensed hot water composition $A_6$: $SO_2$: 0.0011-0.0017 g/L.

Solution 4: The desulfurization-denitration solution, composed of 15% (w/w) of desulfurization-denitration agent, 75% (w/w) of polyethylene glycol 200 and 10% (w/w) of water, said desulfurization-denitration agent was synthesized by mixing polyethylene glycol 200, citric acid and N-methyldiethanolamine (MDEA) (1:1:1 molar ratio).

The synthetic method of this desulfurization-denitration agent was as follows: 48 Kg citric acid was first dissolved in 50 Kg distilled water, and then 29.75 Kg N-methyldiethanolamine (MDEA) was added slowly to the aqueous solution of citric acid while slowly cooling, such that the temperature did not exceed 50° C.; after thorough dissolution, a citric acid MDEA solution was formed, then 50 Kg polyethylene glycol 200 was added to the citric acid MDEA solution and uniform stirring was carried out; the mixture was heated to 90° C.-120° C. and reaction went for 3 hours to obtain 177.75 Kg reactant mixture, in which the desulfurization-denitration agent was 173.25 Kg, and water was 54.5 Kg. Then, 812.25 Kg polyethylene glycol 200 and 55.5 Kg distilled water were added to this 177.75 Kg aqueous solution of desulfurization-denitration agent, stirred and mixed, obtaining 1100 Kg desulfurization-denitration solution composed of 15% (w/w) of desulfurization-denitration agent, 75% (w/w) of polyethylene glycol 200 and 10% (w/w) of water, and this desulfurization-denitration solution was used in the following test: Operation was performed in accordance with the embodiment described above in the apparatus shown in FIG. 1 with this desulfurization-denitration solution, and the operating conditions were as follows:

$T_1$=28.6-31.8° C., $T_2$=25.7-27° C., $T_3$=120.5-121.7° C., $T_4$=112.9-113.7° C., $T_5$=105-105.5° C., and $T_6$=67.3-73.4° C.;

$P_1$=8.89-9 kPa, $P_{2=1.95}$-2.15 kPa, $P_{3=2.15}$-3.1 kPa, and $P_{5=1.75}$-2.35 kPa;

$F_1$=140 m³/hr, $F_2$=0.202 m³/hr, $F_3$=19.7-20.2 m³/hr, and $F_4$=0-4.2 m³/hr.

Experiments were operated according to the procedures, below are the operating data taken from the nightshift on Feb. 11, 2015.

Gas composition before treatment $A_1$: $SO_2$: 1302-2815.5 ppm, $NO_X$: 49.8-459 ppm,
$CO_2$: 4.7-5.6% (v/v), $O_2$: 20.6-20.7% (v/v).

Gas composition after treatment $A_2$: $SO_2$: 4-14.5 ppm, $NO_X$: 0-0.1 ppm, $CO_2$: 4.0-4.2% (v/v), $O_2$: 18.5-18.7% (v/v).

Desulfurization efficiency: 99.44%-99.65%; denitration efficiency: 100%.

Composition of gas released by regeneration $A_3$:
$SO_2$: 89.9%-90.1% (v/v), $NO_X$: 0-0.1% (v/v),
$CO_2$: 4.1-9.6% (v/v), $O_2$: not measured.

Rich liquid composition $A_4$: $SO_2$: 3.51-5.76 g/L, $NO_X$: not measured, pH: 4.6-4.85.

Lean liquid composition $A_5$: $SO_2$: 0.19-0.22 g/L, $NO_X$: not measured, pH: 5.34-5.58.

Condensed hot water composition $A_6$: $SO_2$: 0.004-0.423 g/L.

From the above experimental results, it can be seen that the desulfurization-denitration agent of the present invention has a better effect, and can be used for actual industrialization to remove sulfur dioxide and nitrogen oxides from gases.

What is claimed is:

1. A desulfurization-denitration agent, which is a an ether, an ester, or a mixture thereof,
   wherein the ether or the ester is obtained by a condensation reaction of a reaction mixture comprising a polycarboxylic acid, an alkaline substance, and a polyol component,
   wherein said polycarboxylic acid is a compound containing two or more carboxyl groups in the same molecule,
   wherein said alkaline substance is an inorganic alkaline substance, an organic alkaline substance, or a mixture thereof, wherein said polyol component is a polymeric polyol or a mixture of the polymeric polyol with a polyol, and
   wherein said polymeric polyol is selected from the group consisting of polyethylene glycol, polypropylene glycol, polybutylene glycol, polypropanol, polybutanol, polyethylene glycol monomethyl ether, polyethylene glycol dimethyl ether, polyethylene glycol monoethyl ether, polyethylene glycol diethyl ether, and mixtures thereof.

2. The desulfurization-denitration agent according to claim 1, wherein said polyol is selected from ethylene glycol, propylene glycol, 1,2,3-propanetriol, 1,2-butanediol, 1,3-butanediol, 1,4-butanediol, 2,3-butanediol, 1,4-butylene diol, pentanediol, neo-isopentyldiol, isopentyldiol, 1,5-pentanediol, 1,6-hexanediol, benzenediol, 1,2,4-butanetriol, isobutanetriol, pentanetriol, isopentanetriol, benzenetriol, pentaerythritol, pentanetetraol, isopentanetetraol, butanetetraol, gallic acid, and tannin.

3. The desulfurization-denitration agent according to claim 1, wherein said polycarboxylic acid is selected from the group consisting of ethanedioic acid, propanedioic acid, butanedioic acid, aminoethanedioic acid, nitrilotriacetic acid, EDTA, tartaric acid, tannin acid, polygallic acid and citric acid, and mixtures thereof.

4. The desulfurization-denitration agent according to claim 1, wherein said inorganic alkaline substance is selected from the group consisting of ammonia, alkali metal, alkali earth metal hydroxide, transition metal hydroxide, transition metal carbonate, transition metal carboxylate, and transition metal complex.

5. The desulfurization-denitration agent according to claim 1, wherein said organic alkaline substance is an organic amine selected from the group consisting of aliphatic amines, aromatic amines, and alkylol amines,
   wherein said aliphatic amine is selected from the group consisting of methylamine, dimethylamine, trimethylamine, monoethylamine, diethylamine, triethylamine, monopropylamine, dipropylamine, tripropylamine, n-propylamine, isopropylamine, monobutylamine, dibutylamine, tributylamine, n-butylamine, sec-butylamine, isobutylamine, t-butylamine, ethylenediamine, propylenediamine, hexamethylenediamine, triethylenediamine, diethylenetriamine, triethylenetetramine, tetraethylenepentamine, polyethylenepolyamine, cyclopentylamine, cyclohexylamine, and cycloheptylamine;
   said aromatic amine is selected from the group consisting of aniline, N-methylaniline, N-ethylaniline, N-propylaniline, N-butylaniline, N,N-dimethylaniline, N,N-diethylaniline, N,N-dipropylaniline, N,N-dibutylaniline, phenylenediamine, α-naphthylamine, halogenated aniline, nitroaniline, and sulfoaniline; and
   said alkylol amine is selected from the group consisting of monomethanolamine, dimethanolamine, trimethanolamine, monoethanolamine, diethanolamine, triethanolamine, N,N-dimethylethanolamine, N,N-diethylethanolamine, N,N-diisopropylethanolamine, N-methyldiethanolamine, monopropanolamine, dipropanolamine, tripropanolamine, isopropanolamine, diisopropanolamine, triisopropanolamine, monobutanolamine, dibutanolamine, tributanolamine, N-hydroxyethylethylenediamine, N,N'-dihydroxyethylethylenediamine, N,N-dihydroxyethylaniline, N-ethyl-N-hydroxyethylaniline, N-methyl-N-hydroxyethylaniline, o-aminophenol, m-aminophenol, p-aminophenol, 2,4,6-tris(dimethylaminomethyl)phenol, 3-diethylaminophenol, 2-amino-5-nitrophenol, ammonia cefotaxime acid, N-methylpyrrolidinol, 2,4-diamino-6-hydroxypyrimidine, cyanuric acid, 2-(2'-hydroxy-5'-methylphenyl)benzotriazole, gamma acid, J acid, phenyl J acid, Chicago acid and salts thereof, H acid and salts thereof, di-J acid, and scarlet acid and salts thereof.

6. The desulfurization-denitration agent according to claim 1, wherein a molar ratio of the polyol component: polycarboxylicacid:alkaline substance is 10:0.5-2:0.1-3.

7. The desulfurization-denitration agent according to claim 6, wherein the molar ratio is 1:0.9-1.3:0.5-1.5.

8. The desulfurization-denitration agent according to claim 7, wherein the molar ratio of is 1:1:0.5-1.

9. A desulfurization-denitration solution, comprising: the desulfurization-denitration agent according to claim 1, a glycol, and optionally water, wherein a weight percentage of said desulfurization-denitration agent in the desulfurization-denitration solution is 0.1-50 wt %.

10. The desulfurization-denitration solution of claim 9, wherein the weight percentage of said desulfurization-denitration agent in the desulfurization-denitration solution is 2-30 wt %.

11. The desulfurization-denitration solution of claim 10, wherein the weight percentage of said desulfurization-denitration agent in the desulfurization-denitration solution is 10-20 wt %.

12. A method for treatment of gases, comprising: contacting a gas with the desulfurization-denitration agent of claim 1, whereby sulfur dioxide, nitrogen oxides, or both are removed from the gas.

13. The method according to claim 12, wherein said gas is selected from a group consisting of flue gases, incineration gases, coke-oven gases, synthetic waste gases from dyestuff plants, effluent gases from chemical fiber plants, and industrial feed gases, and waste gases containing $SO_X$, $NO_X$, or both.

* * * * *